United States Patent
Hamaya et al.

(10) Patent No.: US 10,161,519 B2
(45) Date of Patent: Dec. 25, 2018

(54) ELECTRONIC PARKING LOCK APPARATUS

(71) Applicant: Honda Motor Co., Ltd., Tokyo (JP)

(72) Inventors: Toshiyuki Hamaya, Saitama (JP); Hiroshi Takei, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/458,949

(22) Filed: Mar. 14, 2017

(65) Prior Publication Data

US 2017/0292605 A1 Oct. 12, 2017

(30) Foreign Application Priority Data

Apr. 8, 2016 (JP) ................... 2016-077811

(51) Int. Cl.
*F16H 63/34* (2006.01)
*B60T 1/00* (2006.01)

(52) U.S. Cl.
CPC .......... *F16H 63/3466* (2013.01); *B60T 1/005* (2013.01); *F16H 63/3425* (2013.01)

(58) Field of Classification Search
CPC ... F16H 63/3466; F16H 63/3425; B60T 1/005
See application file for complete search history.

(56) References Cited

U.S. PATENT DOCUMENTS

| | | | | |
|---|---|---|---|---|
| 2008/0039282 A1* | 2/2008 | Yoshiyama | ............. | F16H 61/32 477/96 |
| 2008/0264190 A1* | 10/2008 | Nishimura | ............. | F16H 61/22 74/335 |
| 2012/0305360 A1* | 12/2012 | Kitaori | ................ | F16H 63/3466 192/219.4 |
| 2012/0309590 A1* | 12/2012 | Kanai | ..................... | F16H 61/12 477/92 |

FOREIGN PATENT DOCUMENTS

| | | |
|---|---|---|
| JP | 2007247724 | 9/2007 |
| JP | 2008-039094 | 2/2008 |

OTHER PUBLICATIONS

"Office Action of Japan Counterpart Application," with machine English translation thereof dated Dec. 6, 2017, p. 1-p. 4.

* cited by examiner

*Primary Examiner* — Jacob S. Scott
*Assistant Examiner* — Tinh Dang
(74) *Attorney, Agent, or Firm* — JCIPRNET

(57) ABSTRACT

In an electronic parking lock apparatus, a relative rotation angle of an electric motor of an actuator is detected by a relative rotation angle sensor, an absolute rotation angle of the electric motor is calculated according to the relative rotation angle and reference rotation position information obtained by a rotation end limiting portion that limits a rotation end of a rotating component. An absolute rotation angle of the rotating component is detected by using an absolute rotation angle sensor, and the working status of the parking lock is determined according to the absolute rotation angle. The rotation end limiting portion used for obtaining the reference rotation position information of the relative rotation angle sensor and a detected component used for enabling the absolute rotation angle sensor to work to obtain the absolute rotation angle are provided in the same rotating component.

3 Claims, 2 Drawing Sheets

ELECTRONIC PARKING LOCK APPARATUS

CROSS-REFERENCE TO RELATED APPLICATION

This application claims the priority benefit of Japan application serial no. 2016-077811, filed on Apr. 8, 2016. The entirety of the above-mentioned patent application is hereby incorporated by reference herein and made a part of this specification.

BACKGROUND OF THE DISCLOSURE

1. Field of the Disclosure

The disclosure generally relates to an electronic parking lock apparatus. The electronic parking lock apparatus drives a parking pole by using a driving force of an actuator including an electric motor, so that the parking pole is buckled to a parking gear, to enable a parking lock to work.

2. Description of Related Art

According to the Japanese Patent Publication No. 2008-39094, a shift-by-wire apparatus is already well-known. The shift-by-wire apparatus converts an operation of a driver on a shift lever into an electrical signal, and drives a shift actuator on the basis of the electrical signal, so as to change a shift range of a transmission (transmission).

For the shift-by-wire apparatus, after the driver performs an operation on the shift lever to choose a P-range (parking range), the parking pole is buckled to the parking gear by using a driving force of the shift actuator, and a parking lock works.

SUMMARY OF THE DISCLOSURE

Problems to be Resolved by the Disclosure

However, the existing apparatus detects a rotation angle of an electric motor of a shift actuator by using a rotary encoder, and determines a currently-established shift range on the basis of the rotation angle, but the rotary encoder can only detect a relative rotation angle of the electric motor. Therefore, it needs to learn a collision position (rotation limiting position) of the shift actuator, an absolute rotation angle is calculated according to the relative rotation angle of the electric motor, and the shift range is determined on the basis of the absolute rotation angle. However, the collision position of the shift actuator is learnt when at least an ignition switch needs to be turned on each time, and the shift range may be falsely determined due to learning failure or delay.

The disclosure is a disclosure formed in view of the situation, and is directed to improve determining precision of a working status of an electronic parking lock.

Technical Solutions to Resolve the Problems

Accordingly, according to an exemplary embodiment in the disclosure, an electronic parking lock apparatus is provided, including: an actuator, driving a parking pole by using a driving force of an electric motor, so that the parking pole is buckled to a parking gear, to enable a parking lock to work; a relative rotation angle sensor, detecting a relative rotation angle of the electric motor; an absolute rotation angle sensor, detecting an absolute rotation angle of a rotating component, wherein the rotating component is configured in a transfer path of transferring the driving force from the actuator to the parking pole; a parking position holding portion, disposed in the rotating component and holding a status in which the parking pole is buckled to the parking gear; and a rotation end limiting portion, limiting a rotation end of the rotating component in a position which exceeds the parking position holding portion in a rotation direction of the rotating component, to obtain reference rotation position information, wherein the reference rotation position information is a reference of calculating an absolute rotation angle of the electric motor according to the relative rotation angle. Herein, a working status of the parking lock is determined according to the absolute rotation angle of the electric motor, that is calculated according to the relative rotation angle detected by the relative rotation angle sensor and the reference rotation position information, and the absolute rotation angle of the rotating component, that is detected by the absolute rotation angle sensor, wherein, the rotation end limiting portion and a detected component are disposed in the rotating component, and the detected component is overlapped with a detection surface of the absolute rotation angle sensor in the status in which the parking pole is buckled to the parking gear.

In addition, according to another embodiment in addition to the configuration in the abovementioned embodiment, an electronic parking lock apparatus is configured that the detected component moves in parallel along a flat detection surface of the absolute rotation angle sensor.

In addition, according to another embodiment in addition to the configuration in the abovementioned embodiment, an electronic parking lock apparatus is configured that, the detected component moves exceeding a position which is overlapped with the detection surface of the absolute rotation angle sensor when the reference rotation position information is obtained.

Further, a detent plate 24 in an embodiment corresponds to the rotating component in the disclosure, a first concave portion 24a in the embodiment corresponds to the parking position holding portion in the disclosure, a first wall portion 24c in the embodiment corresponds to the rotation end limiting portion in the disclosure, a target arm 28 in the embodiment corresponds to the detected component in the disclosure, a magnetic Hall element sensor 29 in the embodiment corresponds to the absolute rotation angle sensor in the disclosure, and a rotation encoder in the embodiment corresponds to the relative rotation angle sensor in the disclosure.

Effects of the Disclosure

According to the configuration of the exemplary embodiment, a relative rotation angle of an electric motor of an actuator is detected by using a relative rotation angle sensor, an absolute rotation angle of the electric motor is calculated according to the relative rotation angle and on the basis of reference rotation position information obtained by a rotation end limiting portion that limits a rotation end of a rotating component, and determining is performed on a working status of a parking lock according to the absolute rotation angle. Besides, an absolute rotation angle of the rotating component configured in a transfer path of transferring a driving force from the actuator to a parking pole is detected by using an absolute rotation angle sensor, and determining is performed on the working status of the parking lock according to the absolute rotation angle. Therefore, determining precision can be improved by using the determining of two systems that is performed by the relative rotation angle sensor, and the absolute rotation angle sensor.

In this case, the rotation end limiting portion used for obtaining the reference rotation position information of the relative rotation angle sensor and a detected component used for enabling the absolute rotation angle sensor to work to obtain the absolute rotation angle are provided on the same rotating component, so that determining reliability and the determining precision of the working status of the parking lock can be further improved.

In addition, according to the configuration of another embodiment of the disclosure, the detected component moves in parallel along a detection surface of the absolute rotation angle sensor. Therefore, a foreign matter, such as an iron piece, adhered on the detection surface of the absolute rotation angle sensor can be swept away by using the detected component, thereby improving detection precision.

In addition, according to the configuration of another embodiment of the disclosure, the detected component moves exceeding a position which is overlapped with the detection surface of the absolute rotation angle sensor when the reference rotation position information is obtained. Therefore, the foreign matter adhered on the detection surface of the absolute rotation angle sensor can be swept away more practically.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
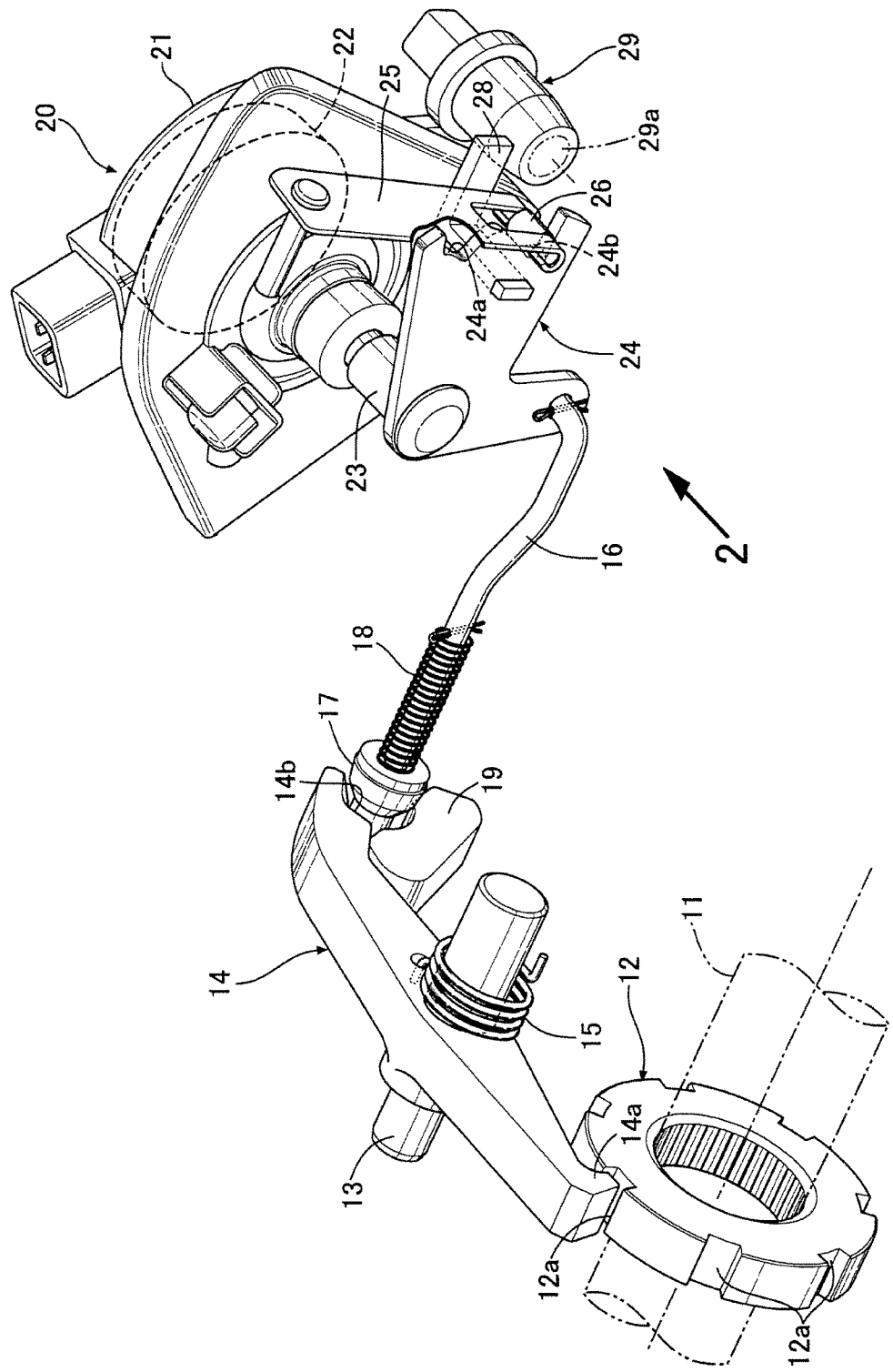
FIG. 1 is a schematic diagram showing an overall configuration of a parking lock apparatus.
Figure 2:
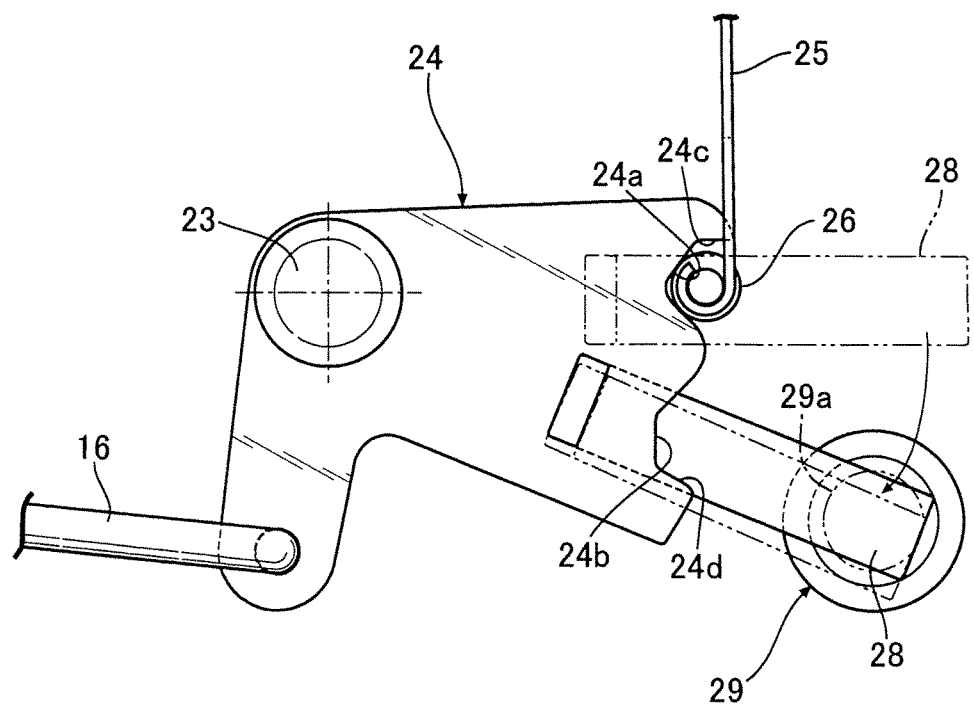
FIG. 2 is an arrow view in a direction of an arrow 2 of FIG. 1.

The following performs description on an embodiment of the disclosure on the basis of FIG. 1 and FIG. 2.

As shown in FIG. 1, to be engaged to a parking gear 12 to enable a parking lock to work, a parking pole 14 supported by a support shaft 13 that is provided on a casing includes an engaging hook 14a that can be buckled to a tooth slot 12a of a plurality of tooth slots 12a of the parking gear 12 on one end and a movable cam portion 14b on the other end. A force is applied to the engaging hook 14a in a direction far away from the tooth slot 12a of the parking gear 12 by using a torsion spring 15 supported on the periphery of the support shaft 13. The parking gear 12 is fixed to a rotating shaft 11 of an automotive transmission. By using an elastic force of a spiral spring 18 supported on the periphery of a parking rod 16, a force is applied to a tapering component 17 that is embedded at a front end portion of the parking rod 16 in a freely-sliding manner in a direction of being buckled to the movable cam portion 14b of the parking pole 14 and a fixed cam portion 19 fixed to the casing. The parking rod 16 is configured in a direction orthogonal to the parking pole 14.

An actuator 20 enabling the parking lock to work or stop working includes: an electric motor 22, accommodated inside an actuator casing 21; an output shaft 23 of the electric motor 22, extending outside the actuator casing 21; a detent plate 24, fixed to the output shaft 23; a plate spring 25, one end being fixed to the actuator casing 21; and a detent roller (detent roller) 26, supported on the other end of the plate spring 25 in a freely-rotating manner.

It can be known from FIG. 2 that: a first concave portion 24a, a second concave portion 24b, a first wall portion 24c, and a second wall portion 24d are formed on the detent plate 24. When the detent plate 24 is in a position of P (parking position), the detent roller 26 is buckled to the first concave portion 24a; when the detent plate 24 is in a position of non-P, the detent roller 26 is buckled to the second concave portion 24b. If the detent plate 24 exceeds the position of P to rotate, the detent roller 26 may cross the first concave portion 24a to collide with the first wall portion 24c, and limit the detent plate 24 to further rotate. In addition, if the detent plate 24 exceeds the position of non-P to rotate, the detent roller 26 may cross the second concave portion 24b to collide with the second wall portion 24d, and limit the detent plate 24 to further rotate.

Besides, the actuator 20 includes: a rotation encoder (not shown in the figure), being a relative rotation angle sensor for detecting a relative rotation angle of the output shaft 23 of the electric motor 22; and a magnetic Hall element sensor 29, being an absolute rotation angle sensor for detecting an absolute rotation angle of the output shaft 23 according to a position of a target arm 28 disposed on the detent plate 24.

The rotation encoder outputs a pulse signal according to each predetermined rotation angle of the output shaft 23, and can detect the relative rotation angle of the output shaft 23 by adding a pulse signal in a positive rotation direction and subtracting a pulse signal in a negative rotation direction, but cannot detect the absolute rotation angle by using a predetermined position as a reference. Therefore, a rotation angle when the output shaft 23 is in the predetermined position is used as a reference rotation angle, and a relative rotation angle serving as an absolute rotation angle starting from the reference rotation angle is detected.

In this embodiment, the predetermined position of the output shaft 23 is a position when the detent roller 26 crosses the first concave portion 24a of the detent plate 24 to collide with the first wall portion 24c. Therefore, it is learnt that a rotation angle of the following position serves as the reference rotation angle, the position is a position in which the actuator 20 is driven to enable the detent plate 24 to exceed the position of P to rotate, the detent roller 26 collides with the first wall portion 24c, and the output shaft 23 cannot further rotate. In this way, the position of P when the parking lock works may be determined as a position when the relative rotation angle starting from the reference rotation angle reaches a predetermined value. In this embodiment, the reference rotation angle is learnt in a case in which an ignition switch is turned on or a power supply temporarily gets lost due to replacement of a battery.

On the other hand, the magnetic Hall element sensor 29 is an absolute rotation angle sensor. Therefore, it is set in the following manner, that is, when the detent plate 24 reaches the position of P, and the detent roller 26 is buckled to the first concave portion 24a, the target arm 28 provided on the detent plate 24 is overlapped with a detection surface (a flat detection surface) 29a (referring to a solid line in FIG. 2) at the center of a front end portion of the magnetic Hall element sensor 29, and the position of P when the parking lock works may be directly determined. With rotation of the detent plate 24, the target arm 28 moves in parallel relative to the flat detection surface 29a of the magnetic Hall element sensor 29 and across an extremely small air gap.

Next, description is performed on functions of the embodiment of the disclosure including the configuration.

After a driver operates a shift lever to the position of P, the electric motor 22 of the actuator 20 works, the detent plate 24 rotates together with the output shaft 23, and the detent plate 24 stops in a position in which the detent roller 26 is buckled to the first concave portion 24a. In this case, the parking rod 16 whose one end is connected to the detent plate 24 moves forwards, the tapering component 17 supported on the parking rod 16 enters between the movable cam portion 14b of the parking pole 14 and the fixed cam portion 19 fixed to the casing, and the movable cam portion 14b leaves the fixed cam portion 19. Therefore, the parking pole 14 swings around the support shaft 13. Consequently, the engaging hook 14a of the parking pole 14 is buckled to one of the tooth slots 12a of the parking gear 12, so that the rotating shaft 11 is limited, and the parking lock works.

When the engaging hook 14a of the parking pole 14 is not buckled to the tooth slot 12a due to a phase of the parking gear 12, the tapering component 17 may compress the spiral spring 18 while remaining in an original position. However, after the parking gear 12 slightly rotates, and positions of the engaging hook 14a and the tooth slot 12a are consistent, the tapering component 17 moves forwards by using the elastic force of the spiral spring 18, so that the parking pole 14 swings, the engaging hook 14a is buckled to the tooth slot 12a, and the parking lock successfully works.

When the parking lock works in the manner, a case in which the detent plate 24 is located in the position of P is determined according to the relative rotation angle of the output shaft 23 of the electric motor 22 that is detected by the rotation encoder and the reference rotation angle obtained through learning; and the case in which the detent plate 24 is located in the position of P is determined according to an absolute rotation angle of the detent plate 24 that is obtained by the magnetic Hall element sensor 29. Next, if determining results of the two are the same, it is finally determined that the parking lock already works; if the determining results of the two are not the same, it is determined that a parking lock apparatus is abnormal and an alarm is outputted. Based on the foregoing, the determining of two systems that is performed by the rotation encoder and the magnetic Hall element sensor 29 can improve determining precision of a working status of the parking lock.

In addition, the first wall portion 24c used for obtaining the reference rotation angle of the relative rotation angle sensor, that is, the rotation encoder, and the target arm 28 used for enabling the absolute rotation angle sensor, that is, the magnetic Hall element sensor 29 to work are provided on the same component, that is, the detent plate 24. Therefore, detection precision of the reference rotation angle and detection precision of the absolute rotation angle of the detent plate 24 can be improved, so that the determining precision of the working status of the parking lock can be further improved.

In addition, if a foreign matter such as iron powder is adhered to the detection surface 29a of the magnetic Hall element sensor 29, the detection precision may be lowered. However, in this embodiment, the target arm 28 provided on the detent plate 24 moves in parallel relative to the detection surface 29a of the magnetic Hall element sensor 29 and across an extremely small air gap. Therefore, the foreign matter, such as iron powder, adhered to the detection surface 29a of the magnetic Hall element sensor 29 may be swept away by using the target arm 28, so as to maintain the detection precision.

Besides, when the reference rotation angle is learnt, the target arm 28 further moves from a position (the position when the detent roller 26 is buckled to the first concave portion 24a) overlapped with the detection surface 29a of the magnetic Hall element sensor 29 to a position (the position when the detent roller 26 collides with the first wall portion 24c) crossing the detection surface 29a. Therefore, the foreign matter such as iron powder can be swept away more practically.

The foregoing performs the description on the embodiment of the disclosure, but various designs and modifications may be performed on the disclosure without departing from the scope of the purpose.

For example, the rotating component in the disclosure is not limited to the detent plate 24 in the embodiment, and only needs to be a rotating component configured in a transfer path of transferring a driving force from the actuator 20 to the parking pole 14.

What is claimed is:

1. An electronic parking lock apparatus, comprising: an actuator (20), driving a parking pole (14) by using a driving force of an electric motor (22), so that the parking pole (14) is buckled to a parking gear (12), to enable a parking lock to work; a relative rotation angle sensor, detecting a relative rotation angle of the electric motor (22); an absolute rotation angle sensor (29), detecting an absolute rotation angle of a rotating component (24), wherein the rotating component (24) is configured in a transfer path of transferring the driving force from the actuator (20) to the parking pole (14); a parking position holding portion (24a), disposed in the rotating component (24) and holding a status in which the parking pole (14) is buckled to the parking gear (12); and a rotation end limiting portion (24c), limiting a rotation end of the rotating component (24) in a position which exceeds the parking position holding portion (24a) in a rotation direction of the rotating component (24), to obtain reference rotation position information, wherein the reference rotation position information is a reference of calculating an absolute rotation angle of the electric motor (22) according to the relative rotation angle, and a working status of the parking lock is determined according to the absolute rotation angle of the electric motor (22), that is calculated according to the relative rotation angle detected by the relative rotation angle sensor and the reference rotation position information, and the absolute rotation angle of the rotating component (24), that is detected by the absolute rotation angle sensor (29), wherein
the rotation end limiting portion (24c) and a detected component (28) are provided in the rotating component (24), and the detected component (28) is overlapped with a detection surface (29a) of the absolute rotation angle sensor (29) in the status in which the parking pole (14) is buckled to the parking gear (12).

2. The electronic parking lock apparatus according to claim 1, wherein
the detected component (28) moves in parallel along the detection surface (29a) of the absolute rotation angle sensor (29).

3. The electronic parking lock apparatus according to claim 2, wherein
the detected component (28) moves exceeding a position which is overlapped with the detection surface (29a) of the absolute rotation angle sensor (29) when the reference rotation position information is obtained.

* * * * *